United States Patent
Håål et al.

(10) Patent No.: US 6,449,644 B1
(45) Date of Patent: *Sep. 10, 2002

(54) METHOD AND A DEVICE FOR INTEGRATING AN ARRANGEMENT OF A NUMBER OF COMPUTERIZED CLIENT SYSTEMS

(75) Inventors: Anders Håål, Stockholm; Torbjörn Ryeng, Lidingö, both of (SE)

(73) Assignee: Corus Technologies Aktiebolag, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,526

(22) Filed: Jul. 8, 1999

(30) Foreign Application Priority Data

Apr. 23, 1999 (SE) .............................................. 9901471

(51) Int. Cl.[7] ............................................. G06F 15/173
(52) U.S. Cl. ...................... 709/223; 709/202; 709/246; 709/238; 709/223; 707/10; 714/18
(58) Field of Search ............................... 709/202, 238, 709/246, 249; 707/10; 714/18

(56) References Cited

U.S. PATENT DOCUMENTS

| | | | |
|---|---|---|---|
| 5,423,023 A | | 6/1995 | Batch et al. |
| 5,490,252 A | * | 2/1996 | Macera et al. ............... 709/249 |
| 6,012,083 A | * | 1/2000 | Savitzky et al. ............. 709/202 |
| 6,049,892 A | * | 4/2000 | Casagrande et al. .......... 714/18 |
| 6,076,117 A | * | 6/2000 | Billings ....................... 709/253 |
| 6,138,120 A | * | 10/2000 | Gongwer et al. .............. 707/10 |
| 6,209,038 B1 | * | 3/2001 | Bowen et al. ............... 709/238 |
| 6,237,041 B1 | * | 5/2001 | Håål et al. ................... 709/246 |

FOREIGN PATENT DOCUMENTS

| | | |
|---|---|---|
| CA | 2191640 | 5/1998 |
| EP | 0 130 375 A2 | 1/1985 |
| WO | 92/22870 | 12/1992 |
| WO | 93/11483 | 6/1993 |
| WO | 93/23817 | 11/1993 |

* cited by examiner

Primary Examiner—Ayaz Sheikh
Assistant Examiner—Thu Ha Nguyen
(74) Attorney, Agent, or Firm—Pearne & Gordon LLP

(57) ABSTRACT

The invention concerns a device for and a method of integrating an arrangement (A) of computerised essentially arbitrary client systems (2) by permitting communication between the client systems. Each client system has a system-specific structure and processes information in a system-specific native format. The device comprises an integrating server (4) and a number of communication connections each connecting one client system to the integrating server (4) for the exchange of a message between said client systems and the server. The integrating server (4) comprises transformation means for transforming said message published by each client system (2) in the system-specific native format to a transformation format permitting subscription of said message by any other client system. Furthermore, the device comprises a tool (3) having means (31) for inputting a description of each client system, means (32) for storing said description, and means (33) for automatically generating from said description the transformation means of the integrating server.

24 Claims, 4 Drawing Sheets

METHOD AND A DEVICE FOR INTEGRATING AN ARRANGEMENT OF A NUMBER OF COMPUTERIZED CLIENT SYSTEMS

THE BACKGROUND OF THE INVENTION AND PRIOR ART

The present invention refers to a method for integrating an arrangement of a number of computerised client systems being independent of each other by permitting communication between the client systems, each client system having a system-specific structure and being adapted to process information in a system-specific native format.

Furthermore, the invention refers to a device for integrating an arrangement of a number of computerised client systems being independent of each other by permitting communication between the client systems, each client system having a system-specific structure and being adapted to process information in a system-specific native format.

Today, firms and organisations frequently rely for their daily processes on a number of different software applications on one or several hardware structures, i.e. computerised client systems, which are operating independently of each other. There is a need to integrate such essentially arbitrary client systems to make them co-operate and exchange data. Such integration is provided by connecting pairs of client systems to each other at a low system level by means of translation programs using different communication protocols. However, in order to obtain a global integration of the different client systems a myriad of specialised system-to-system programs is provided. The result is a spaghetti-like tangle of complex system inter-dependencies forming an effective gridlock for any further system development. Moreover, since the different client systems may not operate independently of each other any longer, the performance and the efficiency of each system is significantly reduced.

It has been proposed to integrate a number of independent client systems by the provision of an integrating server to which all of said client systems are connected. However, such an integrating server quickly grows to a very complicated client system which requires a considerable amount of computer programming work. In addition, such an integrating server need to be modified each time a new client system is to be integrated, or when a software application or a hardware structure is upgraded or replaced in any of the client systems.

The Swedish patent application No. 9803579-3, which corresponds to the U.S. patent application Ser. No. 09/211, 462 and which belongs to the Applicant of the present application, discloses a device for and a method of integrating an arrangement of a number of computerised essentially arbitrary client systems. The content of these prior applications are incorporated herein by reference.

A further problem in connection with such an integration is that the integration process is complicated and requires a sophisticated software and hardware infrastructure. Thus, the tools for the integration are not immediately available to a possible user.

Moreover, a considerable investment is to be made before the integration may be realised, and thus before the user can rely on the function and the use of the integration.

SUMMARY OF THE INVENTION

The object of the present invention is to facilitate the integration process for integrating different computerised client systems.

In particular, it is aimed at a method and a device offering a high availability for any possible user to the integration process, and moreover enabling a substantial reduction of the investment costs in connection with the initial phase of the integration.

This object is obtained by a method for integrating an arrangement of a number of computerised client systems being independent of each other by permitting communication between the client systems, each client system having a system-specific structure and being adapted to process information in a system-specific native format, the method comprising the steps of:

providing an integrating platform accessible to the client systems via a network;

providing a primary connection between a user and said integrating platform via said network;

describing interactively the client systems to be integrated and transferring said description via said primary connection and said network from the user to said integrating platform;

generating, by means of said description, an integrating engine at said integrating platform and a number of communication connections for the exchange of information between the client systems and said integrating engine;

integrating the client systems by means of said integrating engine via said communication connections and said network; and operating the arrangement, whereby information in a system-specific format from one client system is processed in another system-specific format by another client system.

By providing such an integrating platform via a network, all the tools, which are required for the achievement of the integration of a number of essentially arbitrary client systems, are available to any user who may initiate and complete the integration via said network. Such a high availability is an important advantage enabling for a user to test the function and the operation of the integration, i.e. a selected number of integrated client systems, be fore a final investment decision is taken, The network may be realised by a public network, such as Internet, wherein the integrating platform may be available via a public web-server a private network, such as an Intranet, wherein the integrating platform may be available via a web-server connected only to the intranet, or any other network.

The integrating engine, which is arranged to operate the integration, may be located on the integrating platform. Said description of each client system is made by the user in interactive communication with the integrating platform, and enables the generation of the integrating engine as source code files forming the transformation means required to permit the exchange of the information between the different client systems. The integrating platform may comprise an input means including an interface, especially a graphical user interface, GUI, available via the network for facilitating to the user to describe the client systems to be integrated.

According to an embodiment of the invention, the method comprises the further steps of: generating, for each communication connection and by means of said description, a client adapter adapted to the system-specific format and the system-specific structure of respective client system for the exchange of information in the system-specific native format; and implementing said client adapter on the respective client system. Each client adapter may comprise an interface for the respective client system by means of which the client system may publish any information to the integrating engine or subscribe on any information from the integrating engine. Preferably, the client adapter interface is an Application Program Interface, API. Each client adapter is transferred to the respective client system, preferably via the network, for the operation of the arrangement.

According to a further embodiment of the invention, the method comprises the further steps of: generating, for each communication connection and by means of said description, an engine adapter for the exchange of the information in the respective system-specific native format; and implementing said engine adapter on the integrating engine. The engine adapter may be an interface enabling the communication between the respective client adapter and the integrating engine. By the definitions contained in the description, the client adapter and the engine adapter may be generated as source code files which may be implemented on the hardware structure where the client adapter and the engine adapter, respectively, are located. Preferably, each of said client adapters is connected to a respective engine adapter via said primary connection and any arbitrary data protocol. Moreover, an access means may be provided for each client system. Such an access means may comprise an interface to be adopted by the respective client system for integration. This interface is tailored for the client system structure and the client system information at hand.

According to a further embodiment of the invention, the method comprises the further step of: providing a managing unit for monitoring said integrating engine and said client adapters. Preferably, said managing unit is implemented at said integrating engine or the user. By such a managing unit, the operation of the arrangement may be supervised and certain processes may be initiated. Furthermore, the method may comprise the further steps of: providing for each client system a control unit; implementing said control unit on the respective client systems; connecting said control units to said managing unit; and controlling the transfer of data through said client adapters by means of said control units via said managing unit.

According to a further embodiment of the invention, said describing and transferring step comprises describing interactively the client systems by a number of definitions onto a storing means in form of a primary database provided on said integrating platform. Such definitions may contain information on connected client systems, local representations of exchanged information, client system interface characteristics, client system infrastructure etc. The primary database may be a so-called repository database forming a meta model of the different client systems. The repository may remain as a description of all client systems during the operation of the integrated systems. Any change, i.e. upgrading, deletion or replacement, of a client system need only be added to the description, whereafter the integrating engine is changed accordingly in an automatic manner. Preferably, said definitions are transferred as a back-up copy from the primary database to the user via said network.

According to a further embodiment of the invention, said generating step comprises generating by means of said definitions on said integrating engine a transformation means arranged to transform the information published by each client system in the respective system-specific native format to at least one transformation format permitting subscription of the information from any other of the client systems. Furthermore, a secondary database is provided on the integrating engine, wherein said transformation means is implemented on said secondary database, as at least one software algorithm, as well as a table means for each system-specific native format of the client systems and for each specific type of the information to be communicated between the client systems. Thereby, the operating step comprises transferring a message of the information from one table means of one system-specific native format to another table means of another system-specific native format and thereby transforming the format of said message from said one system-specific format to another system-specific format. Each table means, forming the fundamental information carrying entity of the integrating engine, comprises table rows which each contains a piece of information from one of the client systems. At least one table means, forming a base table, may comprise a history log table storing all changes in a table row of said secondary database and an event log table storing all operations concerning the respective table means.

According to a further embodiment of the invention, the method comprises the further steps of: detecting a possible error in a message; storing the error-containing message in a table row of said history log table and in a table row of said event log table; and marking said table row to identify the error. Thereby, the error-containing message may be prevented from being transferred to another client system unless the error is corrected. In such a manner, an advantageous error handling is obtained, which involves the possibility to operate the arrangement although an error is detected on an operation, and transfer said operation to a client system when the error has been corrected. Said detecting means may be comprised by a trigger means arranged to initiate storing of the error-containing message on said history log table and on said event log table. The trigger means may comprise a database trigger. Preferably, said permitting means and said preventing means are comprised by said engine adapter.

The object is also obtained by a device for integrating an arrangement of a number of computerised client systems being independent of each other by permitting communication between the client systems, each client system having a system-specific structure and being adapted to process information in a system-specific native format, wherein the device comprises:

an integrating platform accessible to the client systems via a network arranged to permit a primary connection between a user and said integrating platform;

means provided at said integrating platform and arranged to permit the user to describe interactively the client systems to be integrated and transfer said description from the user to said integrating platform via said primary connection; and means for generating by means of said description an integrating engine at said integrating platform and a number of communication connections for the exchange of the information between the client systems and said integrating engine, said integrating engine being arranged to integrate the client systems via said communication connections and said network and to permit operation of the arrangement, whereby the information in a system-specific format from one client system is processed in another system-specific format by another client system.

Preferred embodiments of the device are defined in the dependent claims 16 to 25.

BRIEF DESCRIPTION OF THE DRAWINGS

The present invention is now to be described more closely by means of an embodiment thereof and with reference to the drawings attached.

DETAILED DESCRIPTION OF AN EMBODIMENT OF THE PRESENT INVENTION

Figure 1:
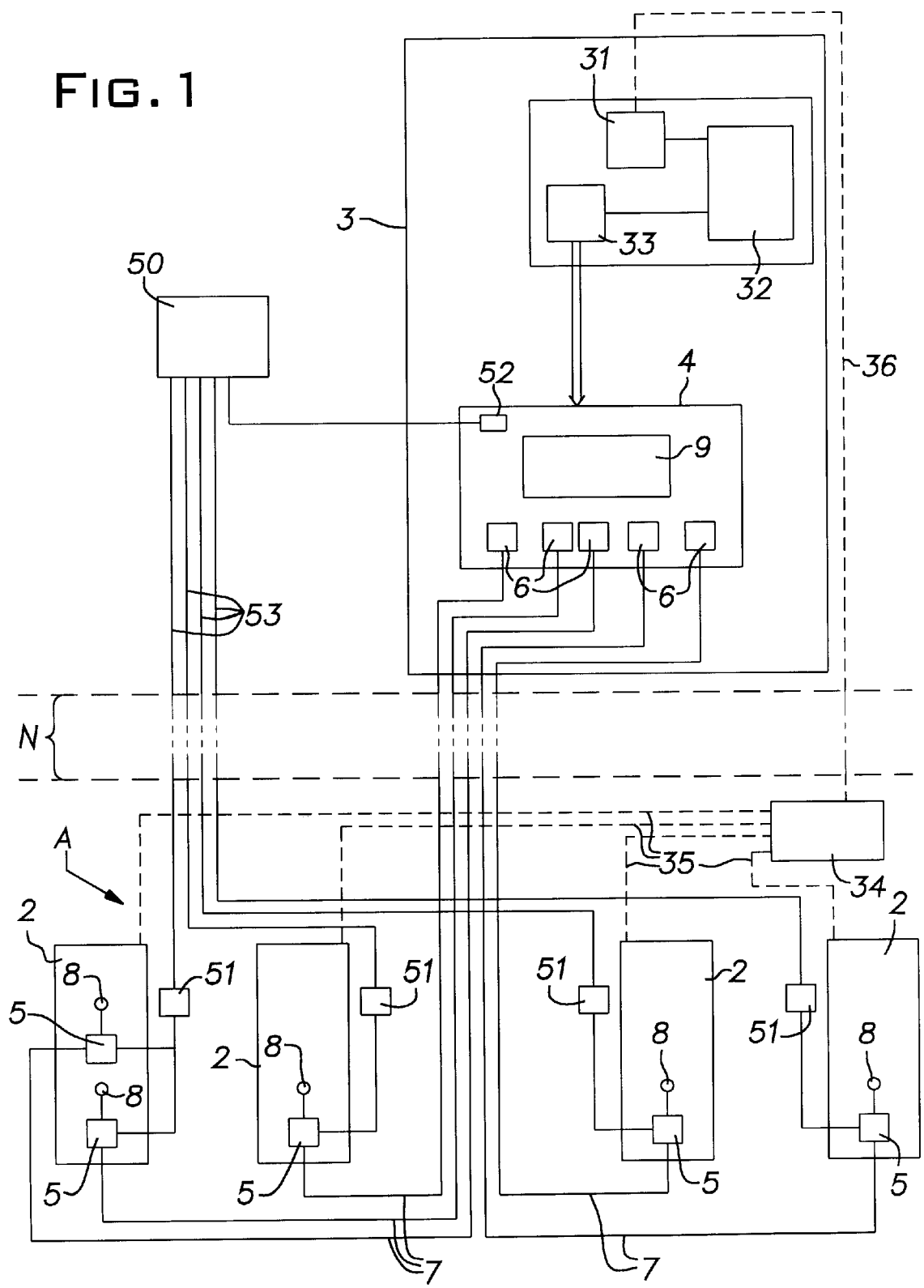
FIG. 1 discloses schematically an arrangement of several integrated, computerised client systems.

FIG. 1 discloses an arrangement A of a number of computerised independent client systems 2. For instance, the client systems 2 may comprise different computer applications within an organisation or a company, such as an order register system, a manufacturing system, a stock handling system, an invoicing system etc. In the arrangement A disclosed, such client systems 2 may be integrated with each other although permitted to operate independently from each other, i.e. one client system 2 may operate in an efficient manner as if any other of the client systems 2 did not exist. In other words, each client system 2 has a system-specific hardware infrastructure and is adapted to process data and information in a system-specific native format. Furthermore, an integrating platform 3 is provided to generate the components to be implemented onto the arrangement A in order to enable such an integration of the client systems 2. The integrating platform 3 is to be described more closely below.

The integrating components for the integration of the arrangement A comprise an integrating engine 4 and a number of communication connections for the exchange of information, in the form of at least one message, between the client systems 2 and the integrating engine 4. Each communication connection is provided to connect one of the client systems 2 to the integrating engine 4. The integrating engine 4 comprises transformation means to be described more closely below, which are arranged to transform information published by each client system 2 in the system-specific native format to at least one transformation format permitting subscription of the information by any other client system 2.

Each communication connection comprises a client adapter 5, adapted to the system-specific format and the system-specific structure of the respective client system 2 for the exchange of messages of information therewith in the system specific native format, an engine adapter 6, for the exchange of messages in the respective system-specific native format with the integrating engine 4, and a connecting link 7, connecting the client adapter 5 and the engine adapter 6 and permitting communication there between by means of an arbitrary data protocol. In the embodiment of FIG. 1, the connecting links 7 are realised by means of a network N, such as Internet, an Intranet or any other public or private network. An access means 8 is located on a memory means of the respective client system 2 and arranged to perform the basic access functions for making messages on the respective client system 2 available to the integrating engine 4 and messages on the integrating engine 4 available to the respective client system 2.

The Client Adapter

The client adapter 5 comprises a software product, which may, as is disclosed in FIG. 1, be located on the respective client system 2, i.e. the client adapter 5 may be registered on a memory means of the client system 2. However, it is also possible to locate the client adapter 5 on an intermediate computer means. The client adapter 5 forms an interface for the respective client system 2, which enables the client system 2 to publish any message to the integrating engine 4 or subscribe on any message of information from the integrating engine 4. According to a preferred embodiment of the invention, the interface is an Application Program Interface, API. All information and data communicated between the respective client system 2 and any other client system 2 is transferred through the client adapter 5. Thereby, the client adapter 5 encapsulates all infrastructure and communication protocols of the integrating components from the client system 2 itself.

The integrating engine 4 may be connected to a client system 2 via one or more communication connections. As is exemplified for the client system 2, to the left in FIG. 1, two such communication connections may be provided. Thereby, two client adapters 5 may be implemented onto the client system 2. It is to be noted, that complicated and large computer applications may require a large number of client adapters 5 together with corresponding engine adapters 6 communicating via a respective communication connection.

Each communication connection is provided to transfer information and data in only one direction. Therefore, each client adapter 5 comprises, as appears from FIG. 2, one first adapter member 5', a so called outbound client adapter, which is arranged to subscribe on information from the integrating engine 4, and a second adapter member 5' a so called inbound client adapter, which is arranged to publish information from the respective client system 2 to the integrating engine 4. Each of the first and second adapter members 5', 5" communicates with the respective client system 2 via a first and second, respectively, access member 8', 8".

The major responsibility for the second adapter member 5", the inbound client adapter, is to meet the requirement of a safe asynchronous communication, i.e. the second adapter member 5" comprises a storing means for a local message queue, permitting publishing of messages in an asynchronous manner. Thereby, transfer of messages from the respective client system 2 may be executed outside the context of the respective client system 2. It is to be noted, that transfer of messages also may be performed in a synchronous manner when required for any reason.

The major responsibility of the first adapter member 5', the outbound client adapter, is to meet the requirements of both event driven and poll based subscription of information. The integrating engine 4 transfers all operations to all client systems 2, i.e. the first adapter members 5'. In order to detect such an event, the subscribing client system 2 first registers all events that are of interest for the respective client systems 2. Then, the first adapter member 5' is arranged to suppress the subscription until a registered event is detected. The first adapter member 5' may also contain means for polling the integrating engine 4 for changes. Such polling may take place regulary by means of a scheduling mechanism or when information is needed for any process in the respective client system 2.

The Engine Adapter

The purpose of the engine adapter 6 is to communicate information to and from the integrating engine 4. The engine adapters 6 are software products, which are located on a memory means of the integrating engine 4 and may comprise an interface. Also the engine adapter 6 comprises, as appears from FIG. 2, a first adapter member 6', the outbound engine adapter, which transfer information from the integrating engine 4 to subscribing client systems 2, and a second adapter member 6", the inbound engine adapter, which receives information from publishing client systems 2 to the integrating engine 4. The first adapter member 6' may comprise a filter means preventing the subscription of information being irrelevant to the respective client system 2.

The Integrating Engine

The integrating engine 4 comprises a database 9, which is called operational data store, ODS, and which contains a table means for each system-specific native format of the client systems 2 and for each specific type of information to be communicated between the client systems 2. The integrating engine 4 is located on the integrating platform 3. It is to be noted, that the database 9 of the integrating engine 4 is independent from the engine adapters 6, i.e. the engine adapters 6 are easily replaceable without influencing the function and operation of the database 9.

One of the table means of the database 9 comprises a base table 10, whereas the other table means comprise a respective format table 11. In the embodiment disclosed, the format of the base table 10 is the system-specific native format of at least one of the client systems 2 and functions as a global format of the database 9, whereas each format table 11 represents the format of at least one client systems 2. In such a manner, each client system 2 of the arrangement A is represented in the database 9 either by the base table 10 or by a format table 11. It is to be noted, however, that the database 9 may also be configured in other ways, for instance the base table 10 may represent a global format located in the centre of the database 9 and not representing any format of any client system 2 of the arrangement A. Alternatively, more than one base table 10 may be provided, wherein all the base tables 10 are connected to all other base tables 10.

Figure 2:
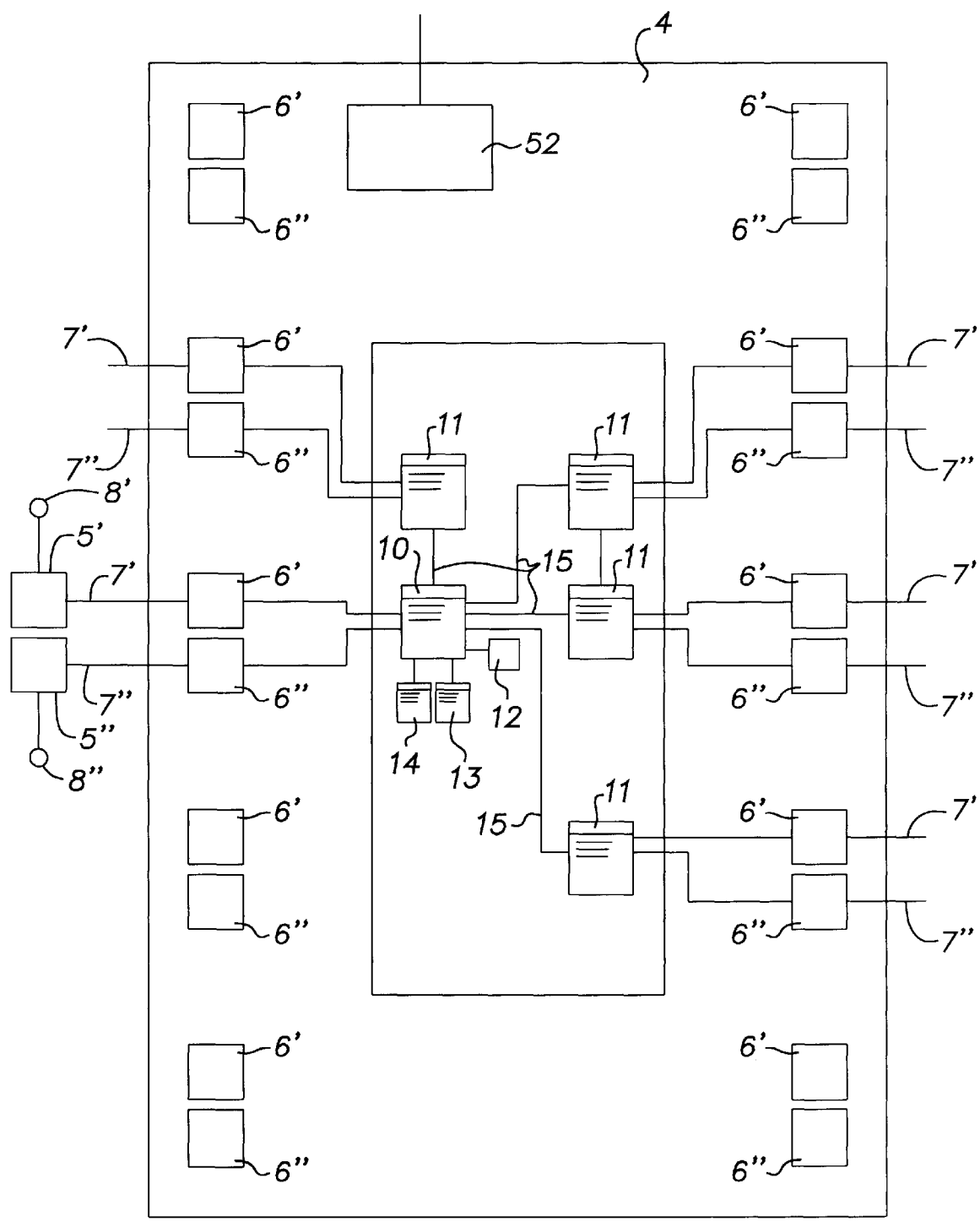
FIG. 2 discloses schematically the structure of an integrating engine of the arrangement in FIG. 1.

It is to be noted, that the base table 10 connected to one client system 2, as disclosed in FIG. 2, in reality may be one of a great number of base tables 10 needed by the client system 2, i.e. one for each type of information to be stored. For the sake of simplicity, the following discussion will only consider one base table 10 and one format table 11 for each client system 2. The base table 10 and each format table 11 contain a number of table rows, each row representing an information item. A message from or to a client system 2 thus corresponds to one or several operations on information items in one or more tables 10, 11. Consequently, a message is a piece of information which results in at least one operation in a table row of the base table 10, wherein such an operation may include creating a new table row, deleting an existing table row or updating an existing table row.

The table means comprising the base table 10 also comprises a trigger means 12 in the form of a database trigger, a history log table 13 and an event log table 14. The history log table 13 is provided to store all changes as a history log record in a table row of the database 9. The event log table 14 is provided to store all operations concerning the respective base table 10 as an event log record.

Furthermore, the database 9 comprises transformation means in the form of software transformation algorithms 15 illustrated by the thickened lines in FIG. 2 and provided to transfer a message from one table 10, 11 to another table 10, 11. Thereby, the format of the message is transformed from the format of said one table 10, 11 to the format of said another table 10, 11.

The integrating engine 4 also comprises means provided to detect a possible error in an operation. Such error detection may be performed by means of the above-defined trigger means 12. The errors may be detected by two types of integrity checks, namely semantic integrity checks, which may be performed on a local table row without information from any other rows in the table or from other tables, and referential integrity checks on a local table row where consistency is checked toward other information sources, i.e. other table rows. Furthermore, errors detected may be permitted to be stored in the history log table 13 and the event log table 14. Thereby, the table row containing an error is marked so that the subscribing client system 2 knows about the error. Such an error-containing table row may be called a pending event as long as the error is marked and thereby the table row is not available for subscription from the history log table 13 and the event log table 14 until the error is corrected. By means of this solution, the operation of the arrangement A, i e. the communication between the different client systems 2 through the integrating engine 4, may continue although error-containing table rows do exist. Moreover, by storing the errors as pending events in the history log table 13 and the event table 14, correction of the errors by the arrangement A itself is made possible and therefore it is believed that the handling of all existing errors at a given point of time will be human manageable.

The Integrating Platform

The integrating platform 3 comprises the tools required to perform interactively the generation of the integrating components of the arrangement A. In particular, these tools includes an input means 31, a storing means 32 and a generating means 33. The tools are realised by software products being stored on a memory means of a computer, for instance a web-server, of the integrating platform 3. The input means 31 comprises an interface, preferably a Graphical User Interface, GUI. The storing means 32 comprises a so-called repository database forming a meta model of different client systems 2. The generating means 33 includes software programs provided to generate source code files forming the integrating components, in particular the database 9 of the integrating engine 4, the engine adapters 6 and the client adapters 5.

Figure 3:
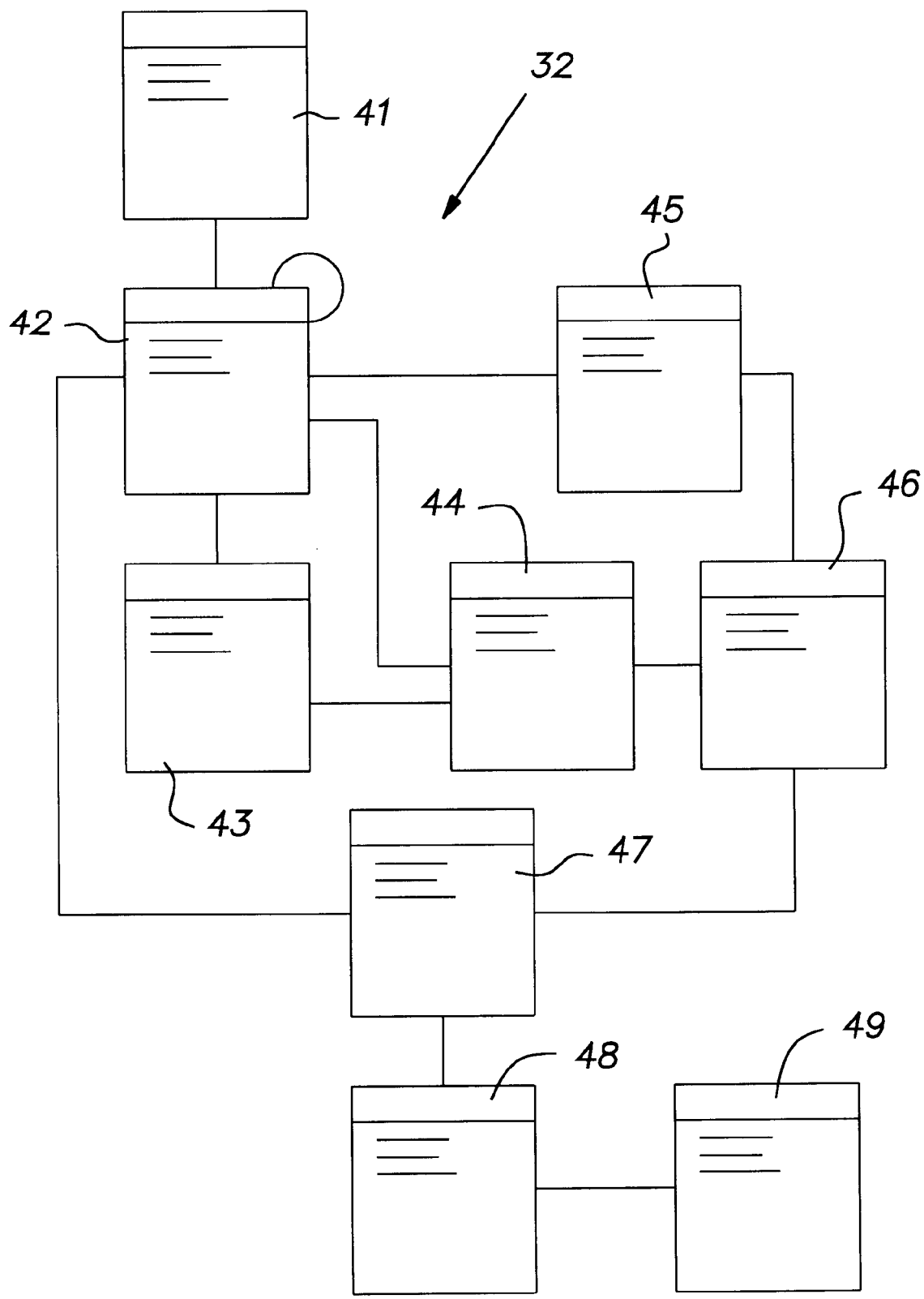
FIG. 3 discloses schematically the structure of the of a repository of the arrangement in FIG. 1.

In FIG. 1, a possible user 34 of the integrating platform 3 is disclosed. The user 34 may be connected to the client systems 2 of the arrangement A via connections 35, which may be permanent or temporary. The user 34 comprises a computer which is connectable to the network N. The integrating platform 3, including for instance a web-server, is available to the user 34 via the network N by a primary connection, for instance an Internet connection 36. Hereby, the user 34 may operate the input means 31, i.e. the graphical user interface of the integrating platform 3. By the primary connection 36 and the input means 31, the different client systems 2, to be connected to the arrangement A, are described interactively by the user 34 and stored in the repository database 32 Such a description is formed by a number of definitions including, for instance, information on connected client systems 2, local representations of exchanged information, client system interface characteristics, client system infrastructure etc. More specifically, the repository database 32 comprises a number of tables, each containing a number of said definitions. FIG. 3 discloses, as an example, a possible configuration of the repository database 32. Table 41 stores the definitions defining the persistent storage structure in the integrating engine 4. Table 42 includes the definitions of the design of each column of each table in the integrating engine 4. Table 43 includes the data type definitions contained in the database 9 of the integrating engine 4. The table 44 defines the semantic integrity constraints provided for local testing of each table row in the tables 10, 11 of the database 9 of the integrating engine 4. Table 45 defines the referential integrity constraints provided for referential testing of the table rows in the tables 10, 11 of the database 9 of the integrating engine 4. Table 46 defines user extension algorithms for more complicated transformations, checks etc. than those normally provided by the generating means. Table 47 defines a message interface. Table 48 defines the adapter types used. Table 49 defines the connected client systems 2.

It is to be noted, however, that the arrangement may be operated without any computer connection between the user 34 and the client systems 2 integrated.

By means of the information stored in these tables 41–49, the generating means 33 generates the different integrating components for the arrangement A. In particularly, the generating means 33 sets up the different client adapters 5, the different engine adapters 6 and the database 9 of the integrating engine 4. Thereafter, these components are implemented on the infrastructure of the respective client system 2 and on the infrastructure forming the location for the integrating engine 4, respectively. The implementation of the client adapters 5 involves downloading via the network N. As appears from FIG. 1, the connecting links 7 are realised via the network N during operation of the arrangement A. In order to monitor the operation of the arrangement A, the integrating process also involves the provision of a managing unit 50 to which a control unit 51 for each client system 2 controlling all client adapters 5 of the respective client system 2, and a control unit 52 for the integrating engine 4 is connected. The control units 51 are, in the embodiment disclosed in FIG. 1, located on the respective client system 2 and the control unit 52 is located on the integrating engine 4. The managing unit 50 is connected to the control units 51 via a connection 53 realised over the network N. The tools of the integrating platform 3 are not involved in the operation of the arrangement A. However, the tools of the integrating platform 3 may remain as an available part of the arrangement A and function as tools for making changes to the arrangement A, such as adaptations to new client systems 2 or updating of existing client systems 2. Moreover, the user 34 may comprise a storing means for storing a back-up copy of the tables 41–49 of the database 32, which are transferred to the user 34 via the primary connection 36.

The Integrating Process

Figure 4:
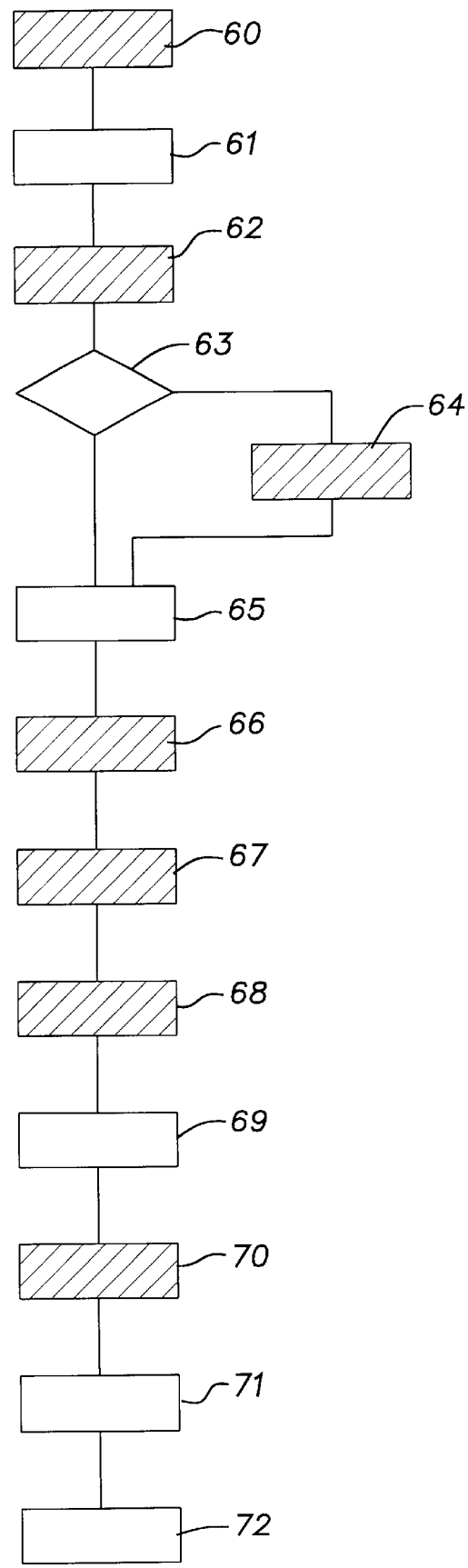
FIG. 4 discloses a flow chart illustrating the integration of the client systems.

FIG. 4 discloses a flow chart illustrating, as an example, the various integrating steps for integrating a number of client systems 2. The empty boxes represent integrating steps on a local position at the user, whereas the boxes marked with lines represent integrating steps on a remote position at least involving the interaction with the integrating platform 3.

Box 60 represents the step of establishing the primary connection 36 with the integrating platform 3.

Box 61 represents the step of identifying locally different system-specific formats of at least two of the client systems 2 to be integrated.

Box 62 represents the step of describing interactively via the primary connection 36 each client system 2 to be integrated with respect to the system-specific format and the system-specific structure of the respective client system 2, and storing this format and this structure in the database 32 at the integrating platform 3.

Box 63 represent the step of comparing locally the differences between the system-specific formats of the different client systems 2. If no such differences exist the process goes directly to box 65.

If such differences do exists, the process goes to box 64 representing the step of describing interactively via the primary connection 36 the software algorithms that perform the transformation of a system-specific format to another system-specific format and storing these software algorithms in the database 32 at the integrating platform 3.

Box 65 represents the step of deciding locally on the interfacing system-specific infrastructure for the client adapters 5.

Box 66 represents the step of describing interactively via the primary connection the interfacing system-specific infrastructure for the client adapters 5 and storing these infrastructures in the database 32 at the integrating platform 3.

Box 67 represents the step of initiating interactively via the primary connection 36 by means of the generating means 33 the generation of the source code files necessary for in the first place the database 9 comprised by the integrating engine 4 and the engine adapters 6, and in the second place the client adapters 5.

Box 68 represents the step of implementing interactively and remotely via the connection 36 the source code files for the database 9 of the integrating engine 4 in the database 9, and the source code files for the engine adapters 6 on the integrating engine 4.

Box 69 represents the step of providing the control unit 51 at the user and configuring locally the control unit 51 to enable connection to the integrating engine 4.

Box 70 represents the step of implementing interactively via the connection 36 the source code files for the client adapters 5 on the respective client systems 2 with the aid of the control unit 51.

Box 71 represents the step of inserting locally an access means 8 into the respective client systems 2 with the aid of the managing unit 50.

Box 72 represents the step of operating the arrangement A of the different client systems 2.

As described above, the arrangement A may be operated as described above in a complete manner including all client systems 2 to be integrated via the network N embodied by Internet, wherein the integrating engine 4 is located on a public web-server. However, it is also possible to move the integrating platform 3, including the integrating engine 4 and the engine adapters 5, to a server of a local network N, such as an Intranet, and thereafter operate the arrangement A locally in the manner described above and in the previous Swedish patent application No. 9803579-3 referred to above.

Moreover, the integrating process disclosed in FIG. 4 may be performed interactively via a connection 36 realised on Internet or a connection 36 realised on a local network such as an Intranet.

The present invention is not limited to the embodiment described but may be varied and modified within the scope of the following claims.

It is to be noted that the order of the integrating steps, within in the scope of the invention, may differ from the order disclosed in FIG. 4. Furthermore, at least some of the integrating steps disclosed may be performed locally instead of remotely and vice versa. For instance, the control unit 51 may be located on the integrating platform 3 and downloaded partly or substantially completely during operation of the arrangement A.

What is claimed is:

1. A method for integrating an arrangement of a number of computerised client systems being independent of each other by permitting communication between the client systems, each client system having a system-specific structure and being adapted to process information in a system-specific native format, the method comprising the steps of:

providing an integrating platform accessible to the client systems via a network;

providing a primary connection between a user and said integrating platform via said network;

describing interactively the client systems to be integrated and transferring said description via said primary connection and said network from the user to said integrating platform;

generating, by means of said description, an integrating engine at said integrating platform and a number of communication connections for the exchange of the information between the client systems and said integrating engine;

integrating the client systems by means of said integrating engine via said communication connections and said network; and operating the arrangement, whereby information in a system-specific format from one client system is processed in another system-specific format by another client system.

2. A method according to claim 1, comprising the further steps of:

generating, for each communication connection and by means of said description, a client adapter adapted to the system-specific format and the system-specific structure of the respective client system for the exchange of the information in the system-specific native format; and implementing said client adapter on the respective client system.

3. A method according to claim 2, comprising the further steps of:

generating, for each communication connection and by means of said description, an engine adapter for the exchange of the information in the respective system-specific native format; and implementing said engine adapter on the integrating engine.

4. A method according to claim 3, comprising the further step of:

connecting each of said client adapters to a respective engine adapter via said primary connection and any arbitrary protocol.

5. A method according to claim 4, comprising the further step of:

providing a managing unit for monitoring said integrating engine and said client adapters.

6. A method according to claim 5, comprising the further step of:

implementing said managing unit at said integrating engine or the user.

7. A method according to claim 5, comprising the further steps of:

providing for each client system a control unit;

implementing said control unit on the respective client systems;

connecting said control units to said managing unit; and controlling the transfer of data through said client adapters by means of said control units via said managing unit.

8. A method according to claim 7, wherein said describing and transferring step comprises describing interactively the client systems by a number of definitions onto a storing means in form of a primary database provided on said integrating platform.

9. A method according to claim 8, comprising the further step of:

transferring said definitions as a back-up copy from the primary database to the user via said network.

10. A method according to claim 8, wherein said generating step comprises generating by means of said definitions on said integrating engine a transformation means arranged to transform the information published by each client system in the respective system-specific native format to at least one transformation format permitting subscription of the information from any other of the client systems.

11. A method according to claim 10, comprising the further steps of:

providing a secondary database on the integrating engine; and implementing on said secondary database said transformation means and a table means for each system-specific native format of the client systems and for each specific type of the information to be communicated between the client systems.

12. A method according to claim 11, wherein the operating step comprises transferring a message of the information from one table means of one system-specific native format to another table means of another system-specific native format and thereby transforming the format of said message from said one system-specific format to another system-specific format.

13. A method according to claim 11, generating a table means comprising a history log table storing all changes in a table row of said secondary database, and an event log table storing all operations concerning said respective table means.

14. A method according to claim 13, comprising the further steps of:

detecting a possible error in a message;

storing the error-containing message in a table row of said history log table and in a table row of said event log table; and marking said table row to identify the error.

15. A device for integrating an arrangement (A) of a number of computerised client systems (2) being independent of each other by permitting communication between the client systems (2), each client system having a system-specific structure and being adapted to process information in a system-specific native format, wherein the device comprises:

an integrating platform (3) accessible to the client systems (2) via a network (N) arranged to permit a primary connection (36) between a user (34) and said integrating platform (3);

means (31, 32) provided at said integrating platform and arranged to permit the user (34) to describe interactively the client systems to be integrated and to transfer said description from the user to said integrating platform (3) via said primary connection (36); and means (32, 33) for generating by means of said description an integrating engine (4) at said integrating platform (3) and a number of communication connections (5, 6, 7, 8) for the exchange of the information between the client systems (2) and said integrating engine (4), said integrating engine (4) being arranged to integrate the client systems (2) via said communication connections (5, 6, 7, 8) and said network (N) and to permit operation of the arrangement (A), whereby the information in a system-specific format from one client system (2) is processed in another system-specific format by another client system (2).

16. A device according to claim 15, wherein each communication connection comprises a client adapter (5) provided on the respective client system (2) and adapted to the system-specific format and the system-specific structure of the respective client system (2) for the exchange of the information in the system-specific native format.

17. A device according to claim 16, wherein each communication connection comprises an engine adapter (6) provided on the integrating engine (4) and adapted to exchange the information in the respective system-specific native format.

18. A device according to claim 17, comprising a managing unit (50) arranged to monitor said integrating engine (4) and said client adapters (5).

19. A device according to claim 18, comprising a control unit (51) provided on each of the client systems (2) and connected to said managing unit (50) for controlling the transfer of data through said respective client adapter (5).

20. A device according to claim 15, comprising a storing (32) means in form of a primary database provided on said integrating platform (3), said storing means being arranged to store said description as a number of definitions (41–49).

21. A device according to claim 20, comprising means (36) arranged to permit a transfer said definitions as a back-up copy from the primary database to the user (34) via said network (N).

22. A device according to claim 20, wherein said generating means (33) is arranged to generate by means of said definitions (41–49) on said integrating engine (4) a transformation means (15) arranged to transform information published by each client system (2) in the respective system-specific native format to at least one transformation format permitting subscription of the information from any other of the client system (2).

23. A device according to claim 22, wherein said integrating engine (4) comprises a secondary database (9) for storing of said transformation means comprises a table means (10, 11) for each system-specific native format of the client systems (2) and for each specific type of the information to be communicated between the client systems (2).

24. A device according to claim 23, wherein said transformation means (15) comprises at least one software algorithm adapted to transfer a message of the information from one table means (10, 11) of one system-specific native format to another table means (10, 11) of another system-specific native format and thereby transforming the format of said message from said one system-specific format to another system-specific format.

* * * * *

UNITED STATES PATENT AND TRADEMARK OFFICE
CERTIFICATE OF CORRECTION

PATENT NO. : 6,449,644 B1
DATED : September 10, 2002
INVENTOR(S) : Anders Håål et al.

It is certified that error appears in the above-identified patent and that said Letters Patent is hereby corrected as shown below:

<u>Column 2,</u>
Line 41, please delete "be fore", and insert therefor -- before --.
Line 42, please delete ",", and insert therefor -- . --.

<u>Column 6,</u>
Line 26, please delete "5'", and insert therefor -- 5" --.

<u>Column 14,</u>
Line 8, please delete "system", and insert therefor -- systems --.

Signed and Sealed this

Thirty-first Day of December, 2002

JAMES E. ROGAN
*Director of the United States Patent and Trademark Office*